United States Patent [19]

Kogiso et al.

[11] Patent Number: 4,827,670
[45] Date of Patent: May 9, 1989

[54] WATER REMOVING STRUCTURE OF ROOF WEATHER STRIP

[75] Inventors: Harumi Kogiso, Inazawa; Keiji Akachi, Gifu, both of Japan

[73] Assignees: Toyoda Gosei Co., Ltd., Nishikasugai; Fuji Jukogyo Kabushiki Kaisha, Tokyo, both of Japan

[21] Appl. No.: 232,677

[22] Filed: Aug. 16, 1988

[30] Foreign Application Priority Data

Aug. 21, 1987 [JP] Japan .................. 62-127542[U]

[51] Int. Cl.$^4$ .................................... E06B 7/16
[52] U.S. Cl. ........................... 49/476; 296/154
[58] Field of Search .......... 49/408, 476; 296/154, 296/213; 248/476

[56] References Cited

U.S. PATENT DOCUMENTS

| 2,451,399 | 10/1948 | Martin | 296/154 |
| 4,475,766 | 10/1984 | McKee | 49/476 |
| 4,494,790 | 1/1985 | Omura | 49/476 |

FOREIGN PATENT DOCUMENTS

| 1047933 | 7/1953 | France | 296/154 |
| 67114744 | 7/1982 | Japan . | |
| 0209616 | 12/1983 | Japan | 296/154 |
| 0073320 | 4/1984 | Japan | 49/476 |

Primary Examiner—Kenneth J. Dorner
Assistant Examiner—Gerald A. Anderson
Attorney, Agent, or Firm—Cushman, Darby & Cushman

[57] ABSTRACT

A water removing structure of a roof weather strip to be installed to a roof side section and a front pillar section of a hard top car. The roof weather strip is composed of a main seal member which encloses and seals a circumferential edge portion of a door glass, and an auxiliary seal member top end of which abuts on the car inside surface of the door glass for sealing, and top end portion of the front door is provided with a mirror bracket of triangular shape which closes an angle containing portion between the door belt line and the front pillar when the door is closed. A water removing groove is formed on the mirror bracket from position between the abutting portions of the main and auxiliary seal members of the roof weather strip to position leading to the door panel inside of the front door so as to guide water. Water entering in a cylindrical space constituted by the main and auxiliary seal members and the car inside surface of the door glass or the mirror bracket flows through the water removing groove into the door panel.

3 Claims, 2 Drawing Sheets

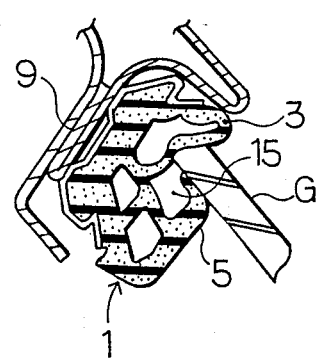
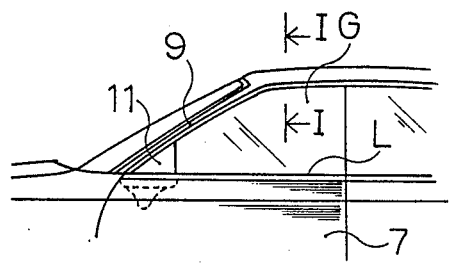
Fig. 1
Fig. 2
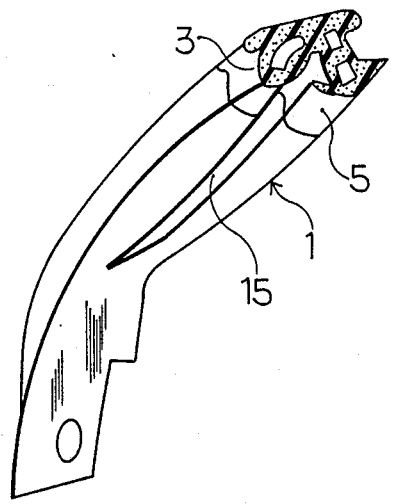
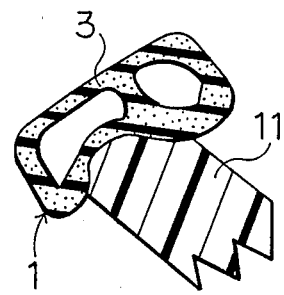
Fig. 3
Fig. 4

WATER REMOVING STRUCTURE OF ROOF WEATHER STRIP

BACKGROUND OF THE INVENTION

The present invention relates to a water removing structure of a roof weather strip in a hard top car.

From the viewpoint of improvement of the seal property, a roof weather strip 1 in a hard top car in recent years is frequently constituted in a two-point seal as shown in FIG. 1, that is, a main seal member 3 with hollow cross-section to enclose and seal a circumferential edge portion of a door glass G and an auxiliary seal member 5 of lip shape with top end portion abutting on an inside surface of the door glass G for sealing are provided. A door mirror is becoming the mainstream in place of a fender mirror in the prior art, and at front end portion of door belt line L of a front door 7 a mirror bracket 11 of triangular shape is installed so as to close an angle containing portion between the door belt line L and the front pillar 9 when the door is closed (refer to FIG. 2).

The top end portion of the roof weather strip 1 abutting on the mirror bracket 11, as shown in FIGS. 3~4, is made a deformed sectional portion where the auxiliary seal member 5 is gradually decreased and disappears and only the main seal member 3 remains.

If the automobile with the roof weather strip 1 assembled as above described runs during a heavy rain or hydraulic car washing is performed and then the front door 7 is opened, the waterdrop may fall into the car room.

It is because a cylindrical space 15 formed by both seal members 3, 5 and the car-inside surface of the door glass G or the door bracket 11 disappears at the same time with the disappearing position of the auxiliary seal member 5 and is of a bottomed structure, and water entering from the interface between the main seal member 3 and the door glass G and flowing into the cylindrical space 15 is stored.

SUMMARY OF THE INVENTION

The invention is in a water removing structure of a roof weather strip to be installed to a roof side section and a front pillar section of a hard top car, wherein the roof weather strip is provided with a main seal member which encloses and seals a circumferential edge portion of a door glass and an auxiliary seal member whose top end portion abuts on a car-inside surface of the door glass for sealing, and at the top end portion of the front door is installed a mirror bracket of triangular shape which closes an angle containing portion between door belt line and a front pillar when the door is closed, characterized in that a water removing groove is formed in the mirror bracket so that water can be guided from position between the abutting positions of the main and auxiliary seal members of the roof weather strip to the position leading to the door panel inside of the front door.

In the water removing structure of the roof weather strip of the invention as above described, since the mirror bracket is provided with the water removing groove which communicates with the lower end of a cylindrical space constituted by the main and auxiliary seal members of the weather strip and the car room side surface of the door glass or the mirror bracket and further guides water into the door panel, water entering in the cylindrical space passes through the water removing groove and flows into the door panel but is not stored to the lower end portion of the cylindrical space. Consequently, even if the automobile runs during a heavy rain or hydraulic car washing is performed and then the front door is opened, the waterdrop does not fall into the car room and a thing or a person is not wetted.

BRIEF DESCRIPTION OF THE DRAWINGS

FIG. 1 is a schematic sectional view taken in line I—I of FIG. 2;

FIG. 2 is a fragmentary side view of an automobile illustrating application portion of the invention;

FIG. 3 is a perspective view illustrating top end portion of a roof weather strip;

FIG. 4 is a sectional view illustrating position relation between a weather strip and a mirror bracket in disappearing position of an auxiliary seal member;

DESCRIPTION OF THE PREFERRED EMBODIMENTS

Figure 5:
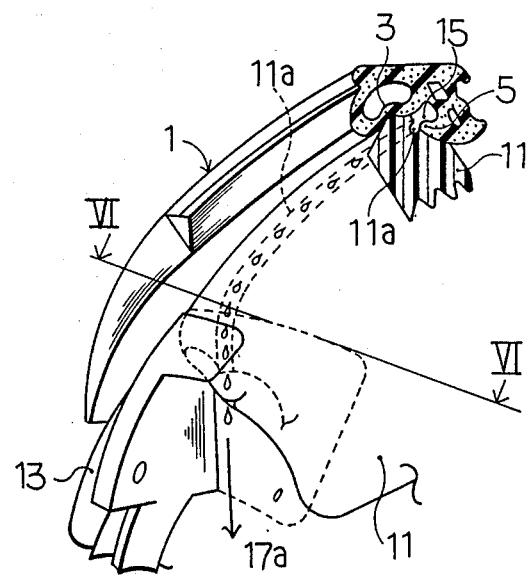
FIG. 5 is a schematic perspective view illustrating an example of water removing structure of a roof weather strip in the invention.
Figure 6:
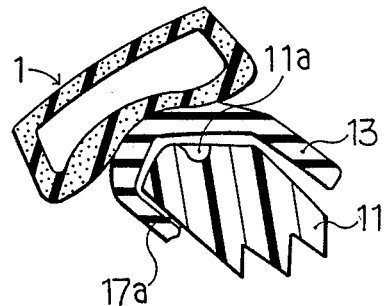
FIG. 6 is a schematic sectional view taken in line VI—VI of FIG. 5.

Embodiments of the invention will now be described referring to the accompanying drawings. The same parts as those in the above description are designated by the same reference numerals, and the description shall be partially omitted.

In similar manner to the above description, a weather strip 1 is installed on a roof side portion 8 of a vehicle body and a front pillar portion 9, and a mirror bracket 11 is installed on front end portion of belt line L of a front door 7 respectively. In this case, a water removing groove 11a is formed on the mirror bracket 11 from position between the abutting portions of both main and auxiliary seal members 3, 5 of the weather strip 1 to position leading to a door panel inside 17a of the front door 7. Although the water removing groove 11a is not particularly limited in sectional shape and size as long as water can flow down, when the sectional shape is semicircular the radius is made about 1mm. Since the hiding state of the roof weather strip 1 is released and the water removing groove 11a is exposed when the door is opened, it is preferable from the viewpoint of the fine appearance that the water removing groove 11a is directed to the vertical direction at the lower portion of the door belt line L along the slant side portion at the front end of the outside of the mirror bracket so as to avoid the passengers eyes reaching the groove. The water removing groove 11a is formed in the mold forming simultaneously when the mirror bracket 11 is molded in the injection molding by poly vinyl chloride (PVC), PVC/NBR polyblend material or the like.

Next, use mode of the embodiment will be described.

When the automobile runs during a heavy rain or the hydraulic car washing is performed in similar manner to the prior art, water may enter from the interface between the main seal member 3 of the roof weather strip 1 and the door glass G. The entering water flows down through the cylindrical space 15 constituted by the main and auxiliary seal members 3, 5 and the car inside surface of the door glass G or the mirror bracket 11. Since the cylindrical space 15 communicates at the lower end with the water removing groove 11a formed on the mirror bracket 11, the entering water flows through the water removing groove 11a as shown in the example to the door panel inside 17a, in case of the shown example, to the rear side position of the door weather strip 13. Consequently, even if the automobile runs during a heavy rain or the hydraulic car washing is performed and then the front door 7 is opened, the waterdrop does not fall into the car room and a thing or a person is not wetted.

Although in the above description, the roof weather strip comprising the main seal member of hollow form and the auxiliary seal member of lip shape is exemplified, the roof weather strip is not particularly limited as long as the cylindrical space is constituted in cooperation with the glass inside surface. For example, the main seal member may be of solid form and the auxiliary seal member may be of hollow form. Further, the water removing groove need not be formed to the lower end of the mirror bracket, but may be stopped at the midway if it is formed to the position where the waterdrop is guided to fall into the door panel.

What is claimed is:

1. A water removing structure of a weather strip, comprising:
   (a) a weather strip installed on a roof side section and on a front pillar section of a hard top car, said weatherstrip having a main seal member for enclosing and sealing a circumferential edge portion intermediate an inside surface and an outside surface of a door glass above the belt line of a car front door and having an auxiliary seal member with a top end portion abutting the inside surface of the door glass to form a seal, whereby a cavity is formed between the main seal member, the auxiliary seal member and the door glass;
   (b) a mirror bracket of triangular form installed at a front end portion of the front door for closing an angular area between the door belt line and the front pillar section when the door is closed; and
   (c) a water removing groove formed on said mirror bracket extending from a first position along the front pillar section which is aligned with the cavity to a second position at the door belt line, so that water collecting in the cavity is guided to the belt line when it enters into the door.

2. A water removing structure of a roof weather strip as set forth in claim 1, wherein said water removing groove has a semi-circular cross-section.

3. A water removing structure of a roof weather strip as set forth in claim 1, wherein said water removing groove is oriented in a vertical direction where the lower end where the bracket meets the door belt line.

* * * * *